(No Model.)
J. MEIER.
PULLEY FOR TRANSMITTING POWER.
No. 486,585. Patented Nov. 22, 1892.
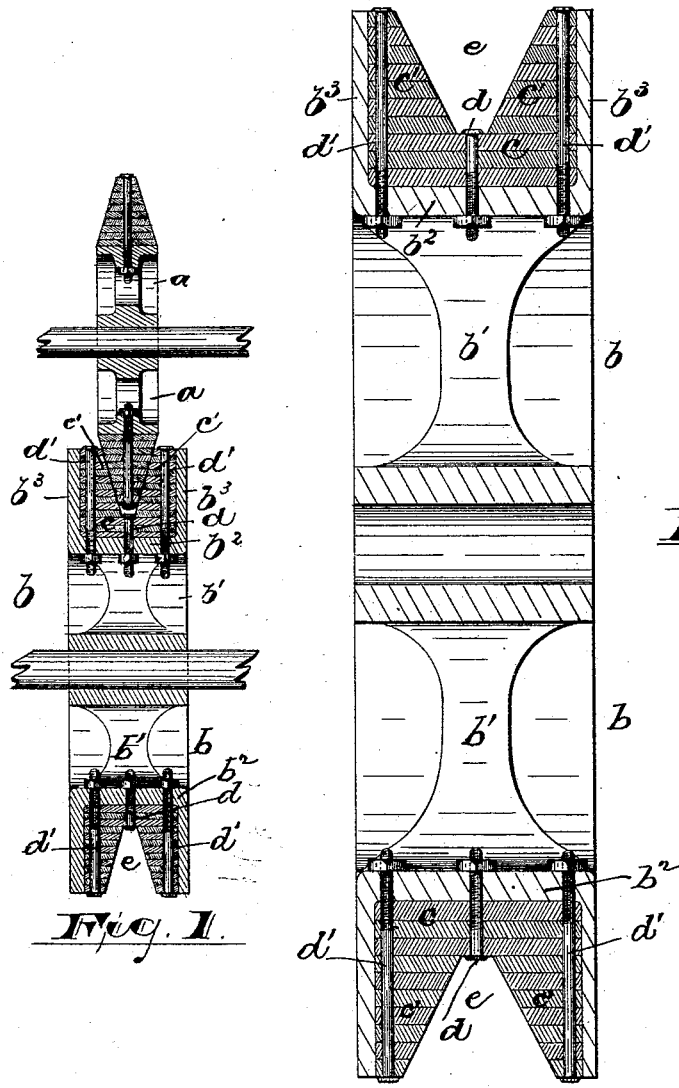
Witnesses
Oscar A. Michel
Anthony P. Smith
Inventor
Joseph Meier
By Drake & Co. Atty's.

UNITED STATES PATENT OFFICE.

JOSEPH MEIER, OF NEWARK, NEW JERSEY.

PULLEY FOR TRANSMITTING POWER.

SPECIFICATION forming part of Letters Patent No. 486,585, dated November 22, 1892.

Application filed December 31, 1891. Serial No. 416,708. (No model.)

*To all whom it may concern:*

Be it known that I, JOSEPH MEIER, a citizen of the United States, residing at Newark, in the county of Essex and State of New Jersey, have invented certain new and useful Improvements in Pulleys for Transmitting Power; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention conduces to a greater economy of power and of factory space in the transmission of power, to a reduction in the cost of construction, and to increased convenience in operation.

The invention consists in the improved pulley for transmitting power and in the arrangements and combinations of parts, substantially as will be hereinafter set forth, and finally embodied in the clauses of the claim.

Referring to the accompanying drawings, in which like letters indicate corresponding parts in each of the figures, Figure 1 is a sectional view showing two pulleys presenting frictional faces one to the other; and Fig. 2 is an enlarged view of a female pulley, showing detailed improvements more clearly.

In said drawings, $a$ and $b$ are respectively male and female pulleys with oppositely-inclined or $\wedge$-shaped peripheral surfaces. The pulley $a$ is provided with a series of layers of leather or similar porous and elastic material, and is substantially of the construction shown in my prior patents, No. 443,102, December 23, 1890, and No. 457,206, August 4, 1891, and needs no detailed description here. The female pulley comprises a metallic body $b'$, having a peripheral seat $b^2$, at the sides or edges of which are flanges $b^3$ $b^3$, integral with said body. The said flanges are thus better adapted to resist the lateral pressure of the male pulley, as will be apparent. Upon said seat $b^2$ is piled a plurality of layers $c$, of leather or similar frictional material, which layers extend clear across the seat from flange to flange to secure the desired elasticity, are cemented or glued to one another and bolted to the seat $b^2$ by a series of bolts $d$, which extends around the wheel at the center thereof. Upon these said layers are cemented other layers $c'$, on opposite sides of the center. These bear against the flanges $b^3$ $b^3$ and gradually grow narrower in width as they approach the periphery of the wheel, forming a V-shaped groove $e$ in the wheel to receive layers of the pulley $a$. These said layers $c'$ are also bolted to the body of the wheel by long side bolts $d'$. The edges of the layers present beveled surfaces which correspond in inclination with the bevels of the wheel $a$. The flange $b^3$ $b^3$ prevent any lateral displacement, owing to the action of the wedge-shaped male pulley. The bolts hold the layers of frictional material against centrifugal force and the glue or cement holds the layers together, and thus, as a result, an elastic body of frictional material is provided and held with great firmness and security. By having the layers of leather arranged in planes concentric or approximately concentric with the seat $b^2$ the abrupt edges of said layers are presented to the male pulley working in the groove formed by said layers, and this conduces to increased durability.

By presenting two elastic and porous bodies of leather or other frictional material face to face in the manner shown a more perfect frictional contact is secured and a greater power may be transmitted without slipping, thus greatly conducing to economy of power. By dispensing with belts factory space is saved.

Having thus described the invention, what I claim as new is—

1. The improved friction-pulley herein described, combining therein a metallic body having a seat $b^2$, and integral flanges $b^3$ at the opposite edges thereof, between which are bolted layers of leather or like frictional material, having a groove formed therein with oppositely-inclined walls, and bolts $d'$ $d'$, extending through said layers and said seat and holding said layers to said seat, substantially as set forth.

2. The improved friction-pulley comprising a body having a seat $b^2$ and integral flanges formed at the opposite edges of said seat at right angles thereto, layers *c c*, extending clear across said seat, and graduated layers forming a V-shaped groove imposed thereon, short bolts *d*, arranged to hold the layers *c* at the center, and long bolts extending through the graduated layers, all combined substantially as set forth.

In testimony that I claim the foregoing I have hereunto set my hand this 9th day of December, 1891.

JOSEPH MEIER.

Witnesses:
CHARLES H. PELL,
OSCAR A. MICHEL.